United States Patent
Sub

(10) Patent No.: US 7,419,208 B2
(45) Date of Patent: Sep. 2, 2008

(54) CARRIER FOR FRONT END MODULE OF VEHICLE

(75) Inventor: So Won Sub, Daedeok-gu (KR)

(73) Assignee: Halla Climate Control Corp., Daejeon (KR)

( * ) Notice: Subject to any disclaimer, the term of this patent is extended or adjusted under 35 U.S.C. 154(b) by 0 days.

(21) Appl. No.: 11/700,306

(22) Filed: Jan. 31, 2007

(65) Prior Publication Data

US 2007/0182211 A1    Aug. 9, 2007

(30) Foreign Application Priority Data

Feb. 3, 2006    (KR) ...................... 10-2006-0010537
Jan. 16, 2007   (KR) ...................... 10-2007-0004963

(51) Int. Cl.
B62D 25/08    (2006.01)

(52) U.S. Cl. .................................................. 296/193.09

(58) Field of Classification Search ............ 296/193.09, 296/193.1, 193.01, 203.02
See application file for complete search history.

(56) References Cited

U.S. PATENT DOCUMENTS

| 6,189,958 | B1 * | 2/2001 | Guyomard et al. ..... 296/193.09 |
| 6,196,624 | B1 * | 3/2001 | Bierjon et al. ......... 296/193.09 |
| 6,375,252 | B1 * | 4/2002 | Cheron et al. .......... 296/203.02 |
| 6,412,855 | B1 * | 7/2002 | Cantineau et al. ...... 296/187.01 |
| 6,450,276 | B1 * | 9/2002 | Latcau ...................... 180/68.4 |
| 6,517,146 | B1 * | 2/2003 | Cheron et al. .......... 296/193.09 |
| 6,619,419 | B1 * | 9/2003 | Cheron et al. ............... 180/311 |
| 6,672,652 | B2 * | 1/2004 | Takeuchi et al. ....... 296/193.09 |
| 6,729,424 | B2 * | 5/2004 | Joutaki et al. .............. 180/68.4 |
| 2005/0253419 | A1 * | 11/2005 | Kwon .................... 296/193.09 |
| 2005/0275227 | A1 * | 12/2005 | Ahn ........................... 293/155 |
| 2005/0275250 | A1 * | 12/2005 | Wada .................... 296/203.02 |

FOREIGN PATENT DOCUMENTS

JP    2001-180520    3/2001

* cited by examiner

*Primary Examiner*—H Gutman
(74) *Attorney, Agent, or Firm*—The Webb Law Firm

(57) ABSTRACT

A carrier for a front end module of a vehicle includes two side panels; a lower panel arranged across lower ends of the two side panels; two head lamp mounting parts formed outwardly at both sides of an upper end portion of the side panels; and an upper panel formed in a structure of downwardly opened channel type so that both ends thereof are inserted in and removably coupled to a coupling part formed on an upper end of the side panels. A cooling module mounting part is formed together with the side panels and the lower panel. Further, a reinforcing panel is installed along a lower end portion of a downwardly opened portion of the upper panel to reinforce rigidity of the upper panel.

6 Claims, 7 Drawing Sheets

-Prior Art-

-Prior Art-

-Prior Art-

-Prior Art-

CARRIER FOR FRONT END MODULE OF VEHICLE

TECHNICAL FIELD

The present invention relates to a carrier for a front end module of a vehicle, and more particularly, to a carrier for a front end module of a vehicle which is capable of removably coupling an upper central panel.

BACKGROUND ART

Generally, in a vehicle having an engine loaded in a front area thereof, a cooling module such as a radiator or a condenser for heat exchanging cooling water or coolant of an air conditioner is installed in a front area of a vehicle body; a front end module is employed to parts such as cooling modules, head lamps, a bumper and so on to reduce man hour and number of parts. The carrier for a front end module includes, as shown in FIG. 1, a carrier 10, a condenser 42 mounted on the center of the carrier, radiator 44 and a cooling module 40, having a fan shroud assembly 46, head lamps 50 installed at both sides of an upper portion of the carrier 10, and a bumper (not shown) installed by a bumper beam 60 at a front side of a lower end portion of the carrier 10.

The carrier 10, as shown in FIG. 2, is provided with an upper panel 20, a lower panel 22 arranged parallel to the upper panel 20 and two side panels 24 for connecting both sides of central portions of the upper and lower panels respectively so as to form a generally rectangular part for mounting the cooling module at a central portion of the carrier 10. Further, a pair of head lamp mounting part 32 is formed for mounting the head lamps 50 respectively across from both end portions of the upper panel 20 to the both side panels 24 and bumper mounting parts 34 are formed for mounting the bumper beam 60 at a portion of each side panel 24 which is located at a lower side of the head lamp mounting part 32, respectively.

In addition, a center stay 26 for connecting central portions of the upper and lower panels 20 and 22 may be applied for the purpose of reinforcing the carrier 10 constructed as above mentioned while installing a hood latch assembly 70.

Recently used is a hybrid carrier constructed with metal and synthetic resins together, which can be relatively easily manufactured in an integral structure as shown in FIG. 2 by arranging into a mold an upper metal member 20a for reinforcing an upper end of the hybrid carrier, a lower metal member 22a for reinforcing a lower end of the hybrid carrier and two side metal members 34a for reinforcing both sides of the hybrid carrier, each shown in. FIG. 3, and performing insert injection molding with synthetic resins.

There are, however, following problems in the above mentioned conventional carrier.

Since the upper metal member 20a, as shown in FIG. 4, generally has a structure of a rearwardly opened channel type, there is a problem that rigidity is insufficient for supporting the cooling module 40.

In addition, poor appearance may be generated as appearance or size of the molded product does not fit due to a complicated shape and the mold should be modified if the appearance or the size of the molded product does not fit.

In addition, if the center stay 26 for assembling the hood latch assembly 70 is applied, there is a problem that the center stay 26 blocks a central portion of the cooling module mounting part 30 and thus it leads to a poor breathablity of the cooling module 40.

There is another problem that the hybrid carrier is formed in an integral structure by the insert injection molding and thus it is inconvenient to construct or maintain the cooling module 40 mounted in the cooling module mounting part 30 since space of an engine room is small.

DISCLOSURE OF THE INVENTION

It is an object of the present invention to provide a carrier for a front end module of a vehicle which is capable of removably coupling an upper central panel.

To achieve the above object, a carrier for a front end module of a vehicle according to the present invention includes two side panels, each formed with a bumper mounting part at an outside thereof; a lower panel arranged across lower ends of the two side panels; two head lamp mounting parts formed outwardly at both sides of an upper end portion of the side panels; and an upper panel formed in a channel type structure with a downwardly opened U-shape so that both ends thereof are inserted in and removably coupled to a coupling part formed at an upper end of the side panels, and forming a cooling module mounting part together with the side panels and the lower panel.

According to the present invention, the side panels and the lower panel are formed of metal and then are insert injection molded with synthetic resins so as to be connected to each other, and the head lamp mounting part is formed of synthetic resins and is integrated in a hybrid structure to the side panels by the insert injection molding.

Further, the upper panel is preferably formed of metal.

Further, it is preferable that a reinforcing panel with a structure of downwardly opened channel type is installed along a lower end portion of a downwardly opened portion of the upper panel, thereby reinforcing rigidity of the upper panel.

In addition, a hood latch assembly is preferably coupled to a central portion of a front side or rear side of the upper panel.

In addition, the carrier for a front end module of a vehicle is preferably further provided with a first through hole formed at an end portion of the upper panel which is coupled to the coupling part of the side panel, a second through hole formed at a position of the coupling part corresponding to the first through hole, and a fastening means passing through the first and second through holes together for coupling the side panel and the upper panel.

In addition, it is preferable that the coupling part is filled with synthetic resins and is formed to have higher strength than that of the other portion of the side panel.

In addition, the coupling part is preferably formed with a depressed portion for preventing deformation when injection molding of the synthetic resins.

DETAILED DESCRIPTION MAIN ELEMENTS

Figure 1:
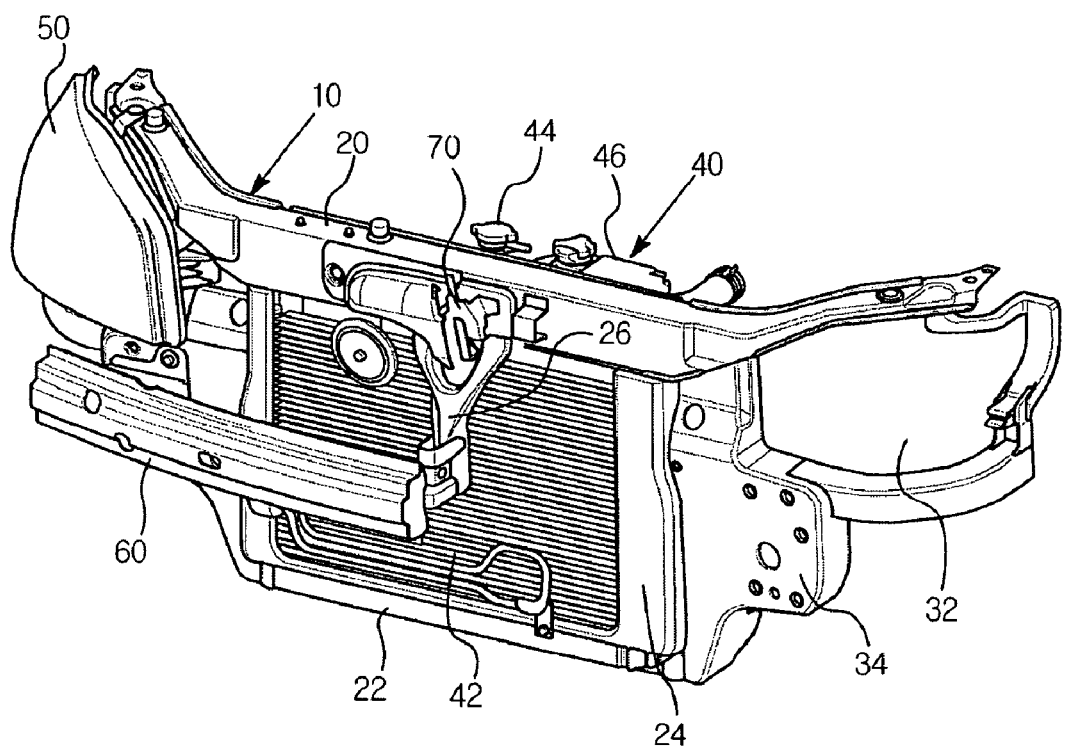
FIG. 1 is a perspective view illustrating an example of a front end module of a conventional vehicle.
Figure 2:
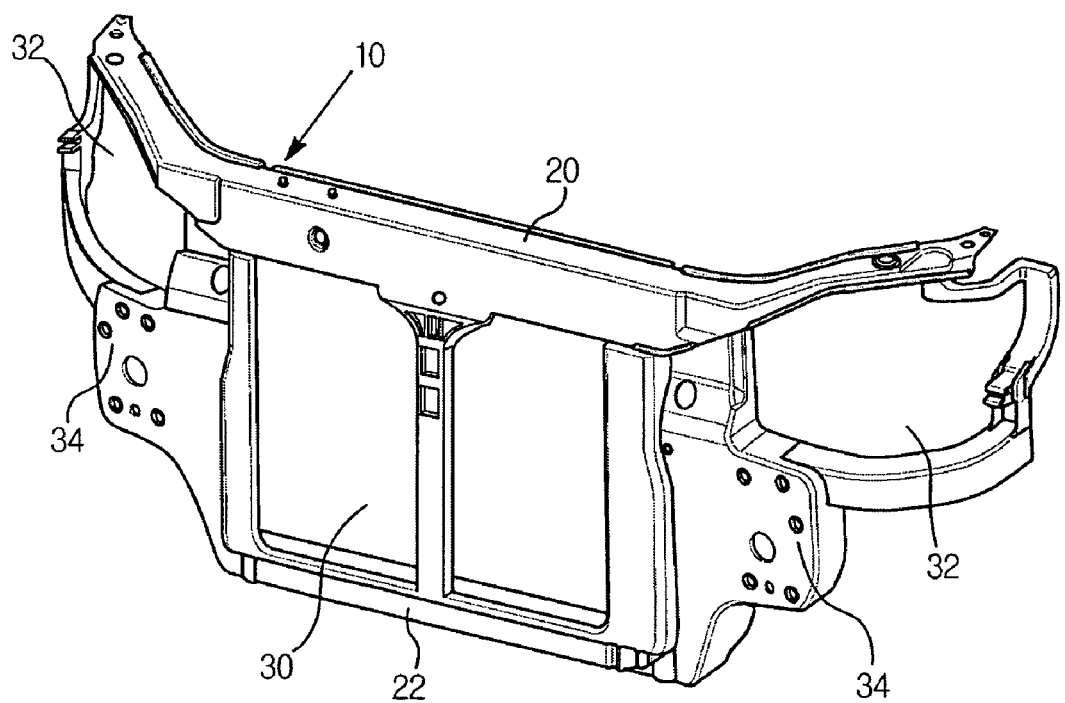
FIG. 2 is a perspective view illustrating a prior hybrid carrier applied to the front end module of the vehicle in FIG. 1.
Figure 3:
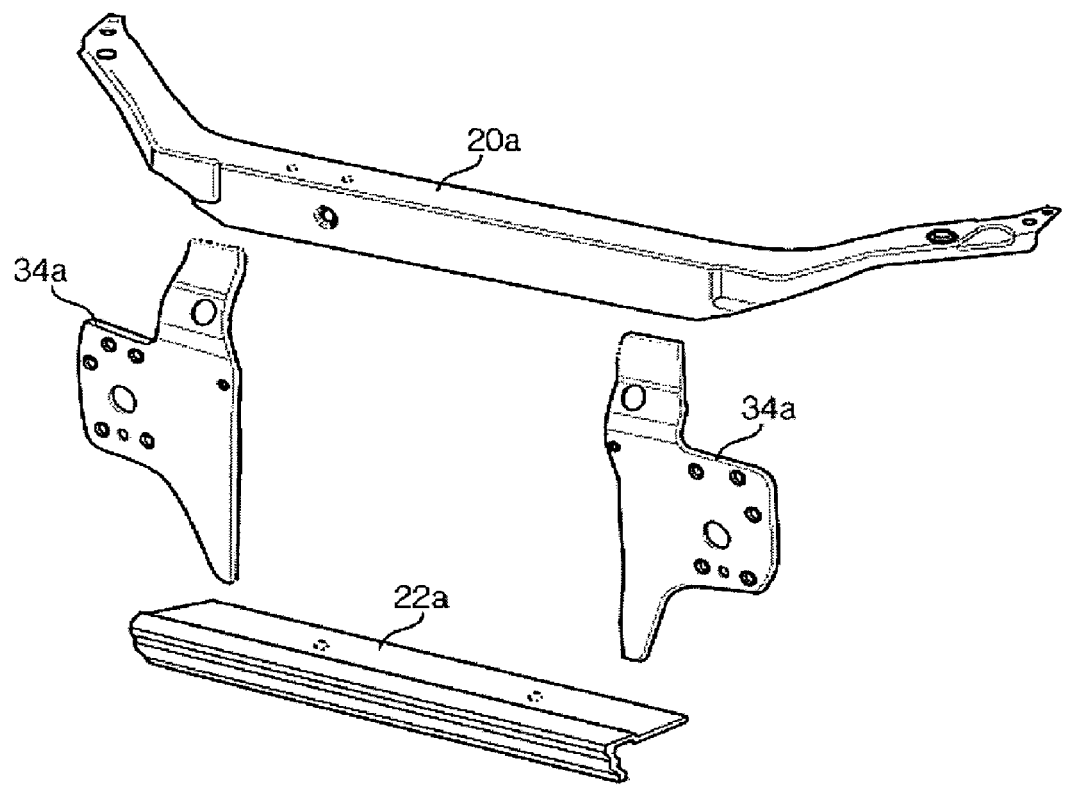
FIG. 3 is an exploded perspective view partially illustrating the prior hybrid carrier.
Figure 4:
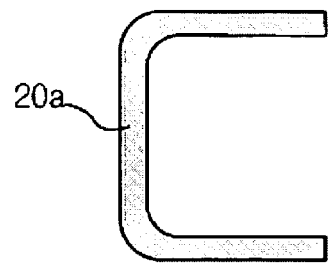
FIG. 4 is a sectional view illustrating an upper metal member which constructs the prior hybrid carrier.

100: side panel
102: bumper mounting part
110: lower panel
120: head lamp mounting part
130: upper panel
140: reinforcing panel
150: cooling module mounting part
160: hood latch assembly

BEST MODE FOR CARRYING OUT THE INVENTION

Practical and presently preferred embodiments of the present invention will be described in detail with reference to the accompanying drawings. The terms and vocabularies used in the description and claims are to express the inventors invention, so they should be interpreted according to technical aspects of the invention.

Figure 5:
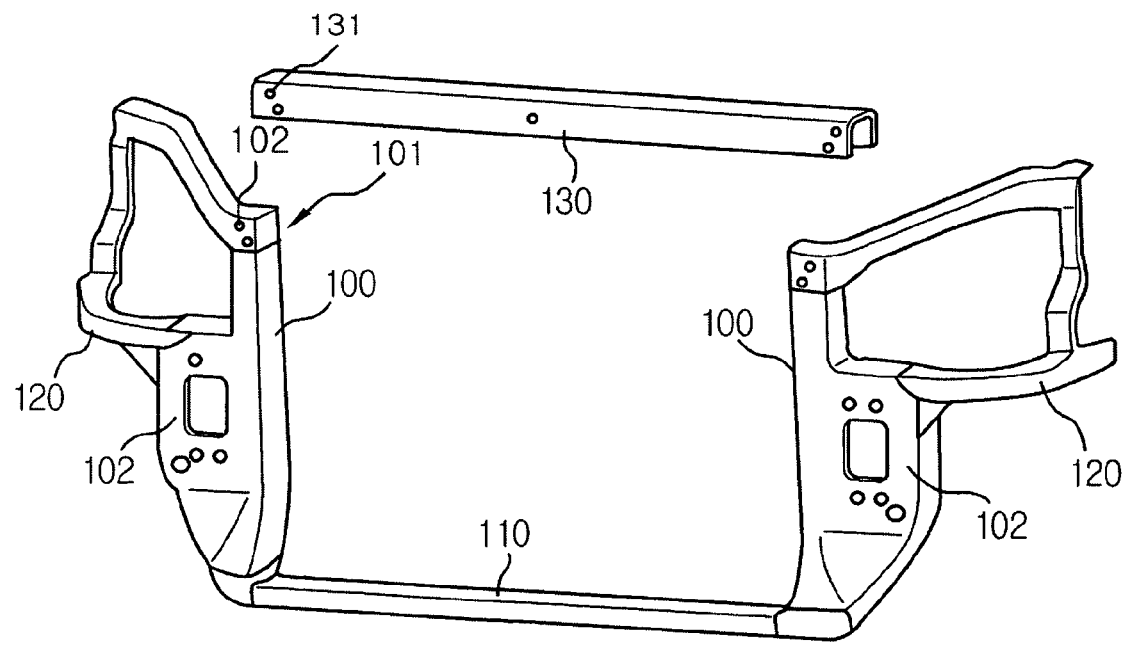
FIG. 5 is an exploded perspective view illustrating a carrier for a front end module of a vehicle according to the present invention.
Figure 6:
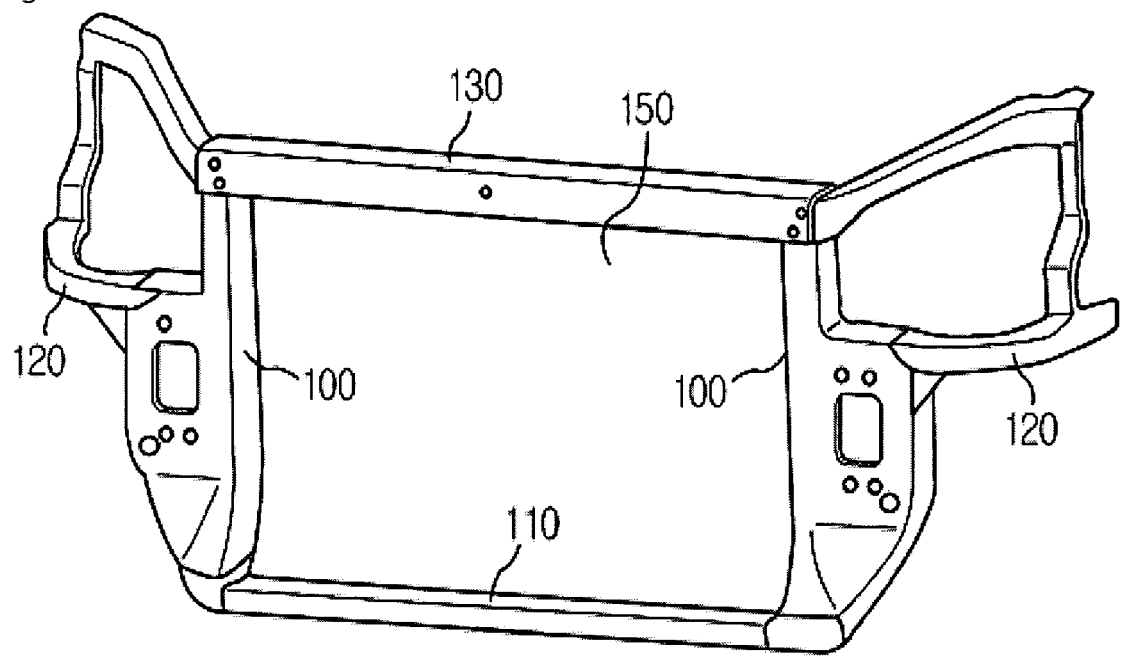
FIG. 6 is an assembled perspective view illustrating the carrier for a front end module of a vehicle according to the present invention.

FIG. 5 and FIG. 6 show a carrier for a front end module of a vehicle according to the present invention.

The carrier according to the present invention includes two side panels 100, a lower panel 110, two head lamp mounting parts 120 and an upper panel 130.

The side panel 100 is provided with a bumper mounting part 102 for mounting a bumper beam 60 (see FIG. 1) at an outside thereof, in which a pair of the bumper mounting parts 102 are arranged in parallel with each other in a predetermined space.

The lower panel 110 is arranged across lower ends of the side panels 100. The side panels 100 and the lower panel 110 are made of metal and insert injection molded with synthetic resins so as to be connected to each other. Further, head lamp mounting parts 120 for mounting head lamp 50 (see FIG. 1) outwardly at both sides of an upper end portions of the side panels 100 are made of synthetic resin by the insert injection molding, thereby capable of being connected to the side panels 100. In other words, the side panels 100, the lower panel 110 and the head lamp mounting parts 120 are integrated in a hybrid structure.

According to the present invention, both ends of the upper panel 130, are removably coupled to upper ends of the side panels 100, and forms a cooling module mounting part 150 for mounting a cooling module 40 (see FIG. 1) together with the side panels 100 and the lower panel 110.

Particularly, as shown in FIG. 5, first through holes 131 are formed at end portions of the upper panel which are coupled to coupling parts 101 of both side panels 100 and second through holes 102 are formed at positions of the coupling parts 101 corresponding to the first through holes 131, and the upper panel 130 and the side panels 100 are firmly fastened by a fastening means 142 such as a bolt and a nut. With above mentioned construction, the upper panel 130 may be a separated type while increasing coupling strength between the upper panel and side panels. For this end, two of the fastening means 142 are preferably provided at both sides respectively.

Figure 7:
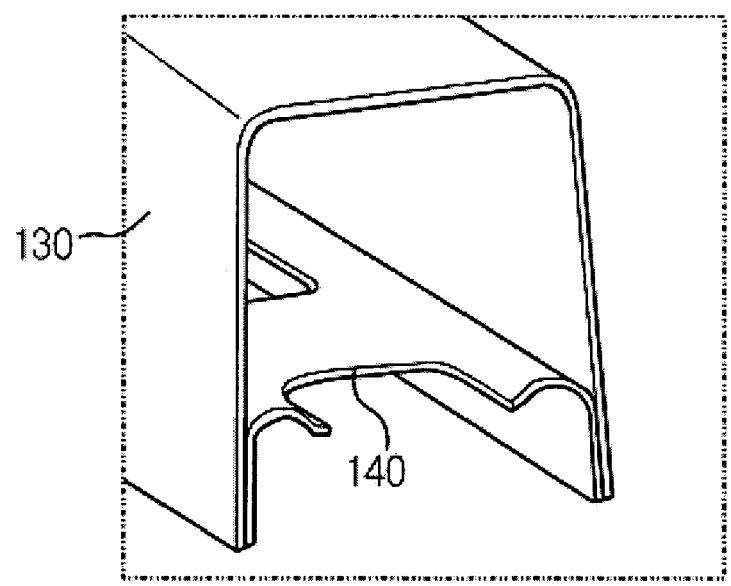
FIG. 7 is a partial perspective view illustrating an inner structure of an upper panel which constructs the carrier for a front end module of a vehicle according to the present invention.
Figure 8:
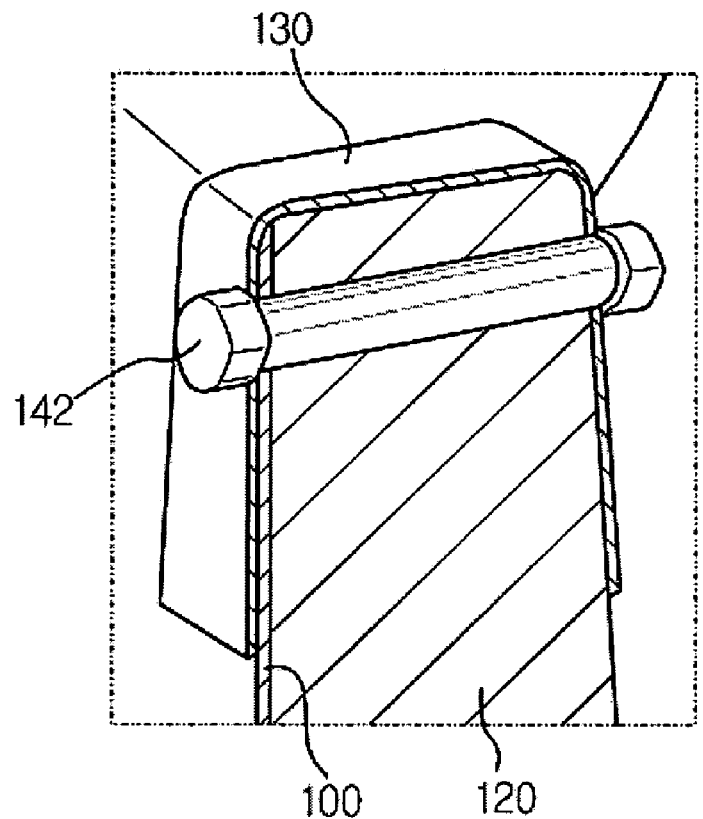
FIG. 8 is a partial perspective view illustrating an assembled structure of the upper panel which constructs the carrier for a front end module of a vehicle according to the present invention.

As shown in FIG. 7, the upper panel 130 has a structure of a downwardly opened channel type. Therefore, as shown in FIG. 8, an upper end of the side panels 100 (specifically, an upper end of a portion where the side panel 100 and the head lamp mounting part 120 are coupled) can be inserted into both ends of the upper panel 130, which are removably coupled by fastening means 142 such as a bolt and a nut.

Figure 9:
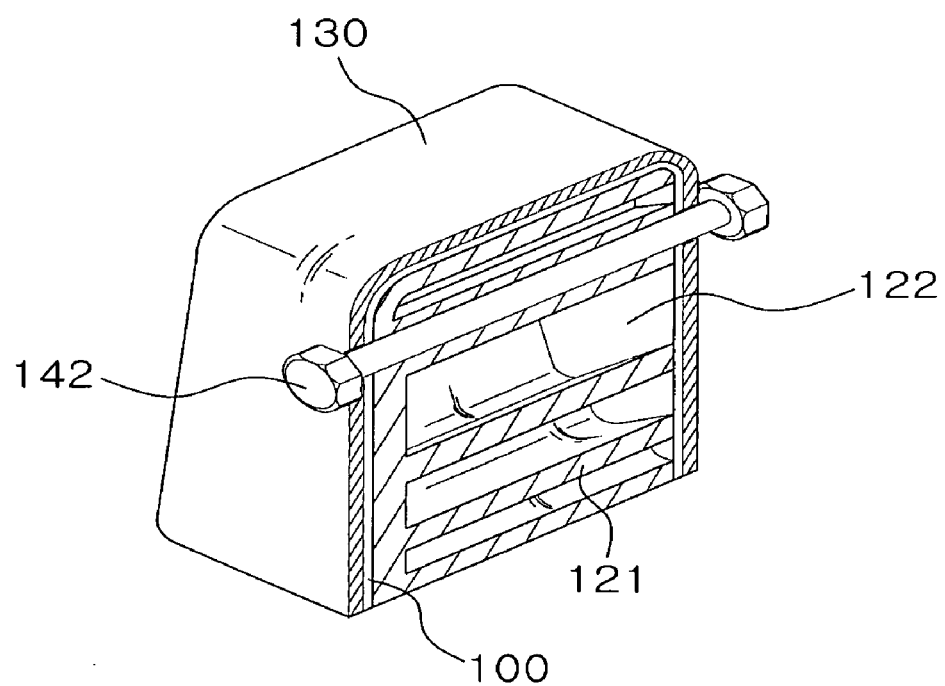
FIG. 9 is a partial perspective view illustrating another assembled structure of the upper panel which constructs the carrier for a front end module of a vehicle according to the present invention.

In order to intensify coupling strength and impact resistance together, as shown in FIG. 9, it is a characteristic of the present invention that the coupling part 101 is filled with synthetic resins. Since, if full of synthetic resins when injection molded, difference in temperature is excessively generated between a central portion and a periphery and thus torsion is generated in process of solidification, which may lead to deformation of the carrier, a depressed part 122 is preferably formed so as to prevent such deformation.

In addition, as shown in FIG. 7, it is preferable that a reinforcing panel 140 having a channel type structure which is opened downwardly along a lower end thereof is installed in a portion of the upper panel 130 which is opened downwardly thereby reinforcing rigidity of the upper panel 130. Further, such structure for reinforcing the rigidity may be diversely varied and which should be included in a scope of the present invention.

Figure 10:
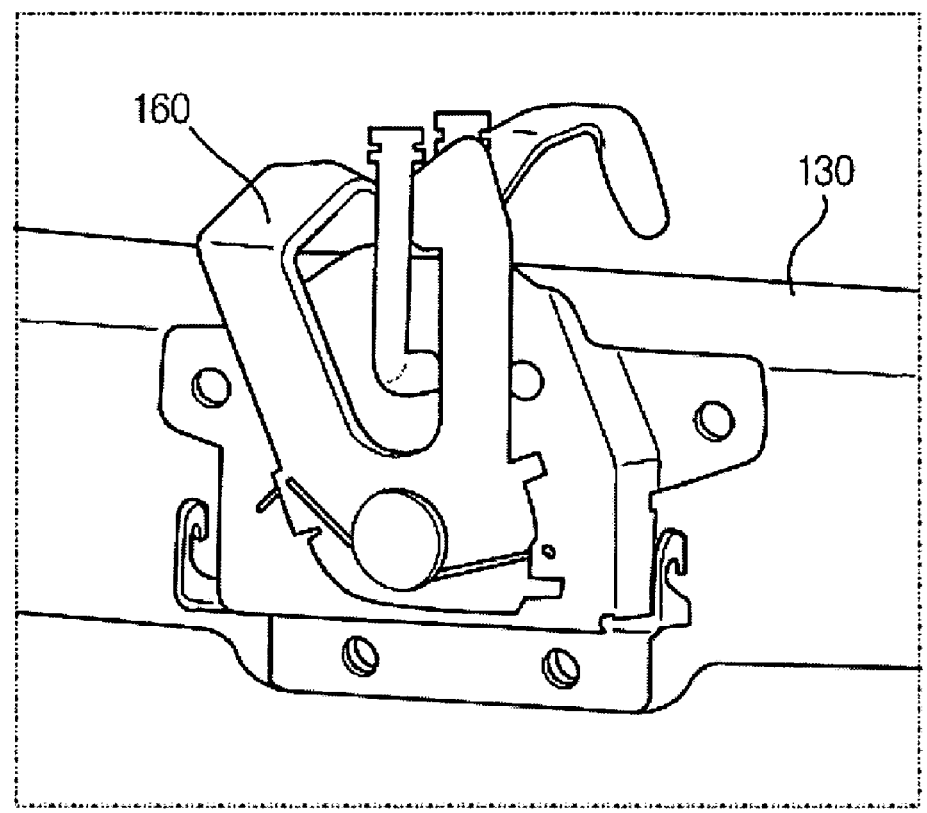
FIG. 10 is a partial perspective view illustrating a state that a hood latch assembly is coupled to the upper panel which constructs the carrier for a front end module of a vehicle according to the present invention.

In addition, as shown in FIG. 10, it is preferable that a hood latch assembly 160 is coupled to a central portion of a front side of the upper panel 130. Further, though it is not shown, the hood latch assembly 160 may be coupled to a central portion of a rear side of the upper panel 130, which should also be included in the scope of the present invention.

Now, operation of the carrier for a front end module of a vehicle according to the present invention constructed as above mentioned will be described herein after.

In manufacturing of the carrier for a front end module of a vehicle according to the present invention, side panels 100 and lower panel 110, for example, are pre-produced with metal, and they are inserted into a injection mold, and then the side panels 100 and lower panel 110 are integrated in the hybrid structure by injection molded product of synthetic resins which formed by injection molding, and further the head lamp mounting parts 120 are integrated to the side panels 100 simultaneously through the insert injection molding. The pre-produced upper panel 130 is assembled by the fastening means 142 to the insert injection molded product which is integrated in the hybrid structure as above mentioned.

In the present invention, since an inside portion of the upper panel 130 is reinforced in a structure of a closed section by the reinforcing panel 140 and rigidity of the carrier according to the present invention can be sufficiently ensured particularly in the case that the upper panel 130 and the reinforcing panel 140 are made of metal and welded each other, a structural problem is not generated even if the hood latch assembly 160 and/or other parts are mounted in the upper panel 130. The hood latch assembly 160 is mounted in the upper panel 130 either before or after the upper panel 130 is assembled to the insert injection molded product of integrated hybrid structure.

As mentioned above, in the process of assembling the upper panel 130, if an appearance or dimensions of the head lamp mounting part 120 does not match, it is possible to compensate correctly an appearance or dimensions of the insert injection molded product of the hybrid structure while assembling the upper panel 130.

After mounting the carrier according to the present invention in a vehicle and constructing the front end module, in the case of maintaining, exemplary, the cooling module because of its trouble, a fastening means for mounting the cooling module in the upper panel 130 is separated, then the fastening means 142 each fastened at both sides of the upper panel 130 is removed so as to separate the upper panel 130 and then it is possible to maintain the troubled portion of the cooling module, whereby the cooling module can be easily maintained in a small space of an engine room and maintenance of other parts mounted in the engine room also can be easily performed.

In addition, rigidity of the carrier of the present invention can be varied or a matter varied according to vehicles can be easily reflected by modifying and varying the upper panel 130 alone.

In addition, it is possible to vary strength or shape of the reinforcing panel 140, whereby varying of rigidity of the carrier of the present invention becomes easier.

INDUSTRIAL APPLICABILITY

According to the carrier for a front end module of a vehicle constructed as described above, since the upper panel 130 is constructed to be removably mountable, modification of injection mold for insert injection molding, particularly in the hybrid structure, or occurrence of poor appearance or poor dimensions can be prevented as it is possible to compensate correctly an appearance or dimensions of integrated other structures while assembling the upper panel 130 if an appearance or dimensions of the integrated other structures do not match.

Further, since the upper panel 130 is constructed to be removably mountable, maintainability can be improved as a troubled part such as the cooling module can be maintained after the upper panel 130 is removed. In addition, maintainability or convenience in vehicle design can be further improved as a matter varied according to vehicles can be easily reflected by modifying and varying the upper panel 130 alone.

Further, since an inside portion of the upper panel 130 is reinforced by the reinforcing panel 140, rigidity of the carrier can be improved and a rigid structure can be improved only by modifying or varying the upper panel 130 or the reinforcing panel 140.

Further, since the hood latch assembly 160 or other parts can be mounted the upper panel 130 having improved rigidity, it is possible to prevent breathablity of the cooling module from being obstructed by a conventional center stay for mounting the hood latch assembly 160 and to reduce a number of parts.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention according to in the appended claims.

The invention claimed is:

1. A carrier for a front end module of a vehicle comprising:
   two side panels each formed with a bumper mounting part at an outside thereof;
   a lower panel arranged across lower ends of the two side panels;
   two head lamp mounting parts formed outwardly at both sides of an upper end portion of the side panels; and
   an upper panel formed in a channel type structure with a downwardly opened U-shape so that both ends thereof are inserted in and removably coupled to a coupling part formed on the upper end portion of the side panels, and forming a cooling module mounting part with the side panels and the lower panel,
   wherein the side panels and the lower panel are formed of metal and then are insert injection molded with synthetic resins so as to be connected to each other, and the head lamp mounting part is formed of synthetic resins and is integrated in a hybrid structure to the side panels by the insert injection molding.

2. The carrier for a front end module of a vehicle according to claim 1, further comprising:
   a first through hole formed at an end portion of the upper panel which is coupled to a coupling part of the side panel, a second through hole formed at a position of the coupling part corresponding to the first through hole, and
   a fastener passing through the first and the second through holes together for coupling the side panel and the upper panel.

3. A carrier for a front end module of a vehicle comprising:
   two side panels each formed with a bumper mounting part at an outside thereof;
   a lower panel arranged across lower ends of the two side panels;
   two head lamp mounting parts formed outwardly at both sides of an upper end portion of the side panels; and
   an upper panel formed in a channel type structure with a downwardly opened U-shape so that both ends thereof are inserted in and removably coupled to a coupling part formed on the upper end portion of the side panels, and forming a cooling module mounting part with the side panels and the lower panel,
   wherein a reinforcing panel with a structure of downwardly opened channel type is installed along a lower end portion of a downwardly opened portion of the upper panel, thereby reinforcing the rigidity of the upper panel.

4. The carrier for a front end module of a vehicle according to claim 3, wherein a hood latch assembly is coupled to a central portion of a front side or a rear side of the upper panel.

5. A carrier for a front end module of a vehicle comprising:
   two side panels each formed with a bumper mounting part at an outside thereof;
   a lower panel arranged across lower ends of the two side panels;
   two head lamp mounting parts formed outwardly at both sides of an upper end portion of the side panels; and
   an upper panel formed in a channel type structure with a downwardly opened U-shape so that both ends thereof are inserted in and removably coupled to a coupling part formed on the upper end portion of the side panels, and forming a cooling module mounting part with the side panels and the lower panel,
   wherein the coupling part is filled with synthetic resins and formed to have higher strength than that of the other portion of the side panel.

6. The carrier for a front end module of a vehicle according to claim 5, wherein the coupling part is formed with a depressed portion for preventing deformation during injection molding of the synthetic resins.

* * * * *